United States Patent [19]

Yamada et al.

[11] Patent Number: 4,967,597
[45] Date of Patent: Nov. 6, 1990

[54] ACCELERATION SENSOR

[75] Inventors: Toshitaka Yamada, Nagoya; Tiaki Mizuno, Toyota; Masahito Imai, Kariya; Haruyuki Ikeo, Oobu; Hirohito Sioya, Anjo; Masahito Muto, Toyota; Motomi Iyoda, Seto, all of Japan

[73] Assignees: Nippondenso Co., Ltd., Kariya; Toyota Jidosha Kabushiki Kaisha, Toyota, both of Japan

[21] Appl. No.: 336,381

[22] Filed: Apr. 11, 1989

[30] Foreign Application Priority Data

Apr. 11, 1988 [JP] Japan .................. 63-88447

[51] Int. Cl.$^5$ .............................................. G01P 15/08
[52] U.S. Cl. ................................................... 73/516 R
[58] Field of Search ................. 73/516 R, 515, 497, 73/522, 651

[56] References Cited

U.S. PATENT DOCUMENTS

| 3,363,470 | 1/1968 | Yavne ................................. 73/515 |
| 3,557,628 | 1/1971 | Tsukada ........................... 73/516 R |
| 3,884,085 | 5/1975 | Beckman et al. . |
| 4,164,263 | 8/1979 | Heintz et al. . |
| 4,275,586 | 6/1981 | Gast et al. . |
| 4,829,822 | 5/1989 | Imai et al. ......................... 73/516 R |

FOREIGN PATENT DOCUMENTS

| 2014210 | 10/1971 | Fed. Rep. of Germany . |
| 2835999 | 3/1980 | Fed. Rep. of Germany . |
| 45-23315 | 8/1970 | Japan . |
| 50-15669 | 6/1975 | Japan . |
| 61-11625 | 1/1986 | Japan . |
| 61-178664 | 8/1986 | Japan . |
| 62-193566 | 12/1987 | Japan . |
| 1155286 | 6/1969 | United Kingdom . |

OTHER PUBLICATIONS

"A Batch-Fabricated Silicon Accelerometer" by L. M. Roylance et al; IEEE Transactions on Electron Devices, vol. ED-26, No. 12, Dec. 1979, pp. 1911-1917.

Primary Examiner—John Chapman
Attorney, Agent, or Firm—Cushman, Darby & Cushman

[57] ABSTRACT

When an acceleration sensor is used, it is attached to a measured object to detect an acceleration applied to the object. The acceleration sensor includes a package having at least one chamber. A sensor element is disposed in the chamber and has a portion which vibrates in response to the acceleration. Damping liquid is sealed within the package and has a quantity which allows the sensor element to be submerged in the damping liquid and which allows a predetermined quantity of gas to remain in the package. The gas absorbs a thermally-induced volume change of the damping liquid. In the absence of the acceleration, a gas bubble is prevented from separating from the gas. In addition, the gas bubble is prevented from staying in the chamber.

8 Claims, 12 Drawing Sheets 4,967,597

1

ACCELERATION SENSOR

BACKGROUND OF THE INVENTION

This invention relates to an acceleration sensor or an accelerometer attached to a measured object.

Some acceleration sensors or accelerometers include a semiconductor strain gauge formed on a cantilevered beam. It is known to place such a cantilevered beam in damping liquid to improve sensor frequency response characteristics.

In an advanced acceleration sensor, gas and damping liquid are sealed within a package accommodating a sensor element. The gas absorbs thermally-induced expansion and contraction of the damping liquid. It is known to place a partition wall in the package to suppress or prevent a choppy motion of the damping liquid which would cause a noise in a sensor output signal.

SUMMARY OF THE INVENTION

It is an object of this invention to provide an excellent acceleration sensor attached to a measured object.

In accordance with a first aspect of this invention, when an acceleration sensor is used, it is attached to a measured object to detect an acceleration applied to the object. The acceleration sensor includes a package having at least one chamber. A sensor element is disposed in the chamber and has a portion which vibrates in response to the acceleration. Damping liquid is sealed within the package and has a quantity which allows the sensor element to be submerged in the damping liquid and which allows a predetermined quantity of gas to remain in the package. The gas absorbs a thermally-induced volume change of the damping liquid. In the absence of the acceleration, a gas bubble is prevented from separating from the gas. In addition, the gas bubble is prevented from staying in the chamber.

In accordance with a second aspect of this invention, when an acceleration sensor is used, it is attached to a measured object to detect an acceleration applied to the object. The acceleration sensor includes a package having a chamber. Damping liquid fills the chamber. A sensor element is disposed in the chamber and is submerged in the damping liquid. The sensor element has a portion which vibrates in response to the acceleration. A member defines at least part of the chamber and is deformable to absorb a thermally-induced volume change of the damping liquid.

DESCRIPTION OF THE FIRST PREFERRED EMBODIMENT

Figure 1:
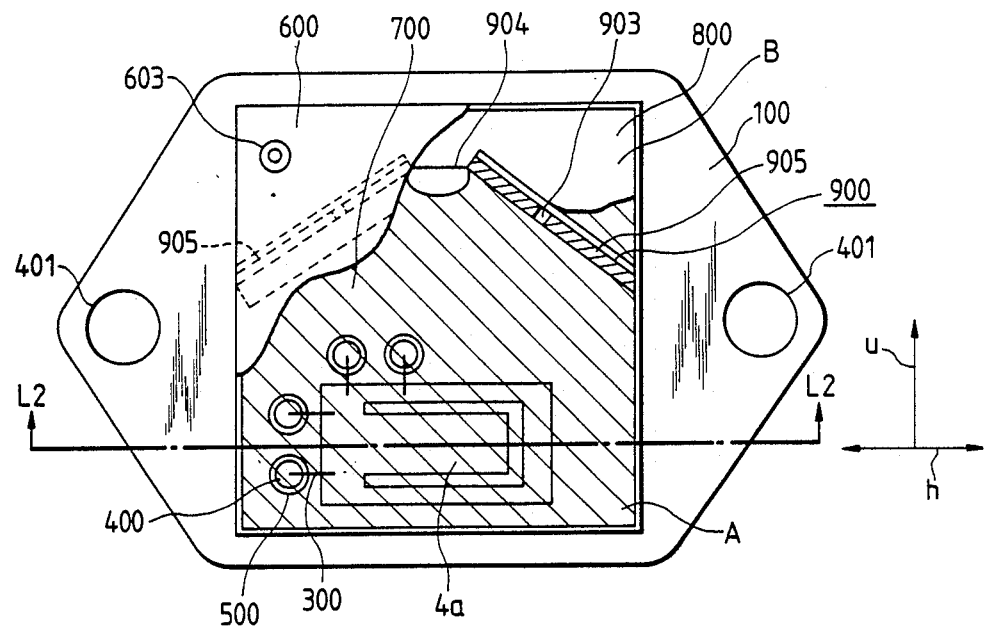
FIG. 1 is a partially cutaway view of an acceleration sensor according to a first embodiment of this invention.
Figure 2:
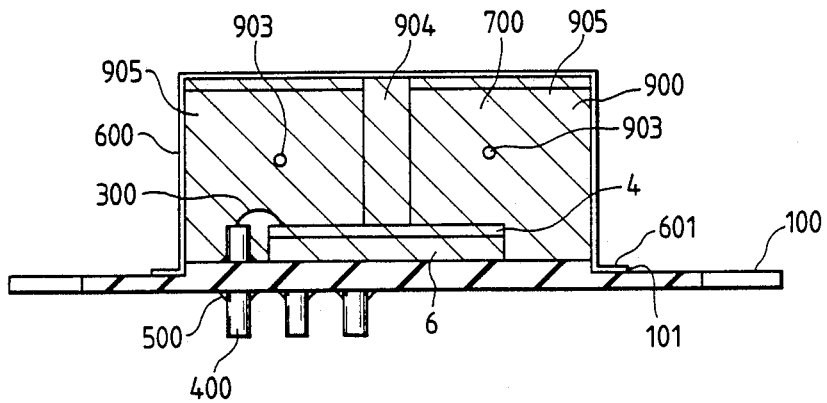
FIG. 2 is a sectional view of the acceleration sensor taken along the line L2—L2 of FIG. 1.

With reference to FIGS. 1 and 2, an acceleration sensor includes a stem or lower package member 100 made of metal such as Kovar. As will be made clear hereafter, the stem 100 forms a portion of a package. The stem 100 has welding portions 101 extending along edges thereof, and a raised portion surrounded by the welding portions 101. The raised portion of the stem 100 is designed to support a base 6 described hereafter. The stem 100 is formed by a suitable process such as press working. In order to attain an electrical connection to a sensor element, the raised portion of the stem 100 is provided with four through-holes accommodating respective electrical terminals 400. The electrical terminals 400 are fixed to the stem 100 by hard glasses 500 which are placed into the respective through-holes in a fusing process. The hard glasses 500 extend between the electrical terminals 400 and the walls of the stem 100. The stem 100 has a pair of holes 401 for attaching the acceleration sensor.

A sensor element of the acceleration sensor includes a cantilever 4a and a base 6 supporting the cantilever 4a.

The base 6 is mounted on the stem 100 by a suitable fixing member such as solder. The cantilever 4a is composed of a semiconductor such as an n-type silicon single crystal substrate or plate.

Figure 3:
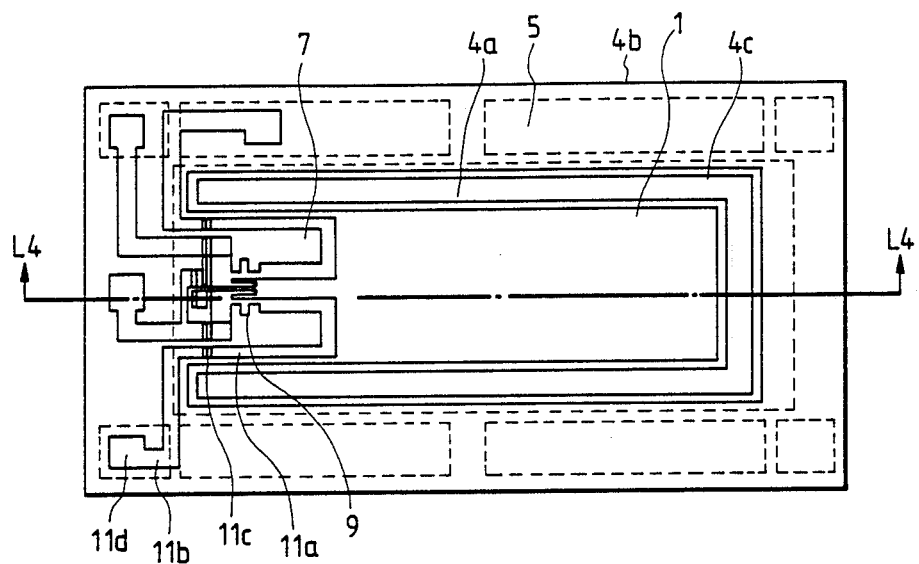
FIG. 3 is a top view of the sensor element of the acceleration sensor of FIGS. 1 and 2.
Figure 4:
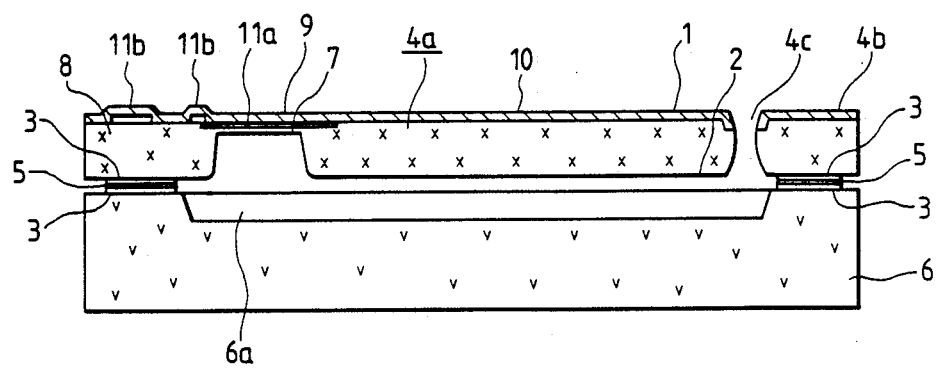
FIG. 4 is a sectional view of the sensor element taken along the line L4—L4 of FIG. 3.

As shown in FIGS. 3 and 4, the cantilever 4a includes a base end or support 8, a free end 1, and a thin diaphragm 7 extending between the support 8 and the free end 1. A guard 4b integrally extending from the support 8 surrounds the free end 1 to protect the free end 1. The guard 4b is spaced from the free end 1 and the diaphragm 7 by a gap 4c.

A scribe alley for producing the gap 4c is created by etching both surfaces of a semiconductor starting material for the cantilever 4a. For example, after the upper surface of a portion of the starting material to be scribed is subjected to etching, the lower surface of the portion is subjected to etching during the formation of the diaphragm 7.

Lower surfaces of given areas of the support 8 and the guard 4b are coated with layers 3 containing solderable metal such as nickel. The formation of the solderable layers 3 is performed by plating or vapor coating. Upper surfaces of given areas of the base 6 are correspondingly coated with layers 3 of solderable metal which oppose the solderable layers 3 on the support 8 and the guard 4b. The corresponding layers 3 of the members 4b, 6, and 8 are bonded together via layers 5 of solder. In this way, the support 8 and the guard 4b are fixed to the base 6.

Figure 6:
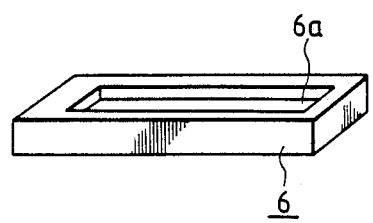
FIG. 6 is a perspective view of the base of the sensor element of FIGS. 1–5.

The cantilever 4a is displaced in response to the acceleration to be measured. As shown in FIGS. 4 and 6, the upper surface of the base 6 has a recess 6a of a predetermined depth which allows the displacement of the cantilever 4a. The depth of the recess 6a is chosen to prevent an excessive displacement of the cantilever 4a which would cause damage to the cantilever 4a.

Four semiconductor strain gauges 9 are formed in or on the diaphragm 7 of the cantilever 4a by a known semiconductor processing technique. For example, during the formation of the semiconductor strain gauges 9, p-type impurities consisting of suitable atoms such as boron are injected into the n-type silicon diaphragm 7 in a thermal diffusion technique or an ion implantation technique. The four semiconductor strain gauges 9 are electrically connected in a full bridge by wiring layers 11a and wiring members 11b formed on the diaphragm 7 and the support 8 of the cantilever 4a. For example, the wiring layers 11a are formed by injecting p-type impurities into the n-type silicon diaphragm 7 at a high concentration or density. For example, the wiring members 11b are made of aluminum films formed on the support 8 by vapor coating.

Two of the wiring layers 11a have a U-shaped portion, extending from the related semiconductor strain gauges 9 toward the tip of the cantilever free end 1 and turning back toward the cantilever support 8. In the event of a break of the diaphragm 7, this U-shaped structure enables the wiring layers 11a to be broken so that the acceleration sensor can output a warning signal of a given waveform. The wiring layers 11a are electrically connected to the wiring members 11b via contact portions 11c respectively. The wiring members 11b extend to pads 11d which are electrically connected to the terminals 400 via leads 300 respectively.

The upper surfaces of the cantilever 4a and the guard 4b are coated with protective layers or films 10 made of suitable material such as silicon dioxide.

When the cantilever 4a is exposed to an acceleration, the free end 1 of the cantilever 4a moves relative to the support 8 so that a stress is induced in the diaphragm 7. The stress in the diaphragm 7 varies the resistances of the semiconductor strain gauges 9 in different manners, unbalancing the bridge circuit of the strain gauges 9 in resistance. Accordingly, the bridge circuit of the strain gauges 9 is unbalanced in accordance with the acceleration. In cases where a preset potential is applied to the bridge circuit of the strain gauges 9, the bridge circuit outputs a voltage which depends on the unbalance of the bridge circuit and which thus represents the acceleration.

Figure 5:
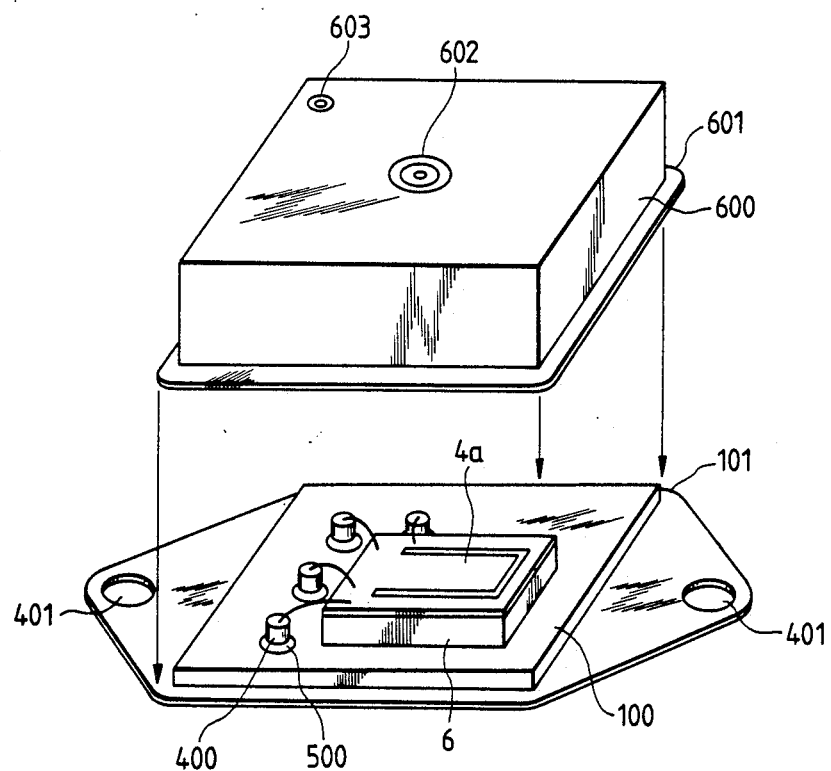
FIG. 5 is a perspective view of the acceleration sensor of the first embodiment of this invention in which the shell is separated from the stem.

As shown in FIGS. 1, 2, and 5, a shell or upper package member 600 takes the form of a box having a recess open at the lower surface and flanged edges 601 extending around the open lower end of the recess. The shell 600 is formed by a suitable process such as press working. The flanged edges 601 define welding portions which oppose the welding portions 101 of the stem 100. The welding portions 601 of the shell 600 and the welding portions 101 of the stem 100 are sealingly bonded together by a welding process. The stem 100 and the shell 600 form a package which defines a chamber accommodating the sensor element. It should be noted that, in FIG. 5, the package is disassembled to show an internal structure.

As shown in FIGS. 1 and 2, a partition wall 900 extends within the recess of the shell 600. The partition wall 900 is fixed to the shell 600 by a suitable bonding process such as spot welding. The partition wall 900 is made of resilient material such as stainless steel.

Figure 7:
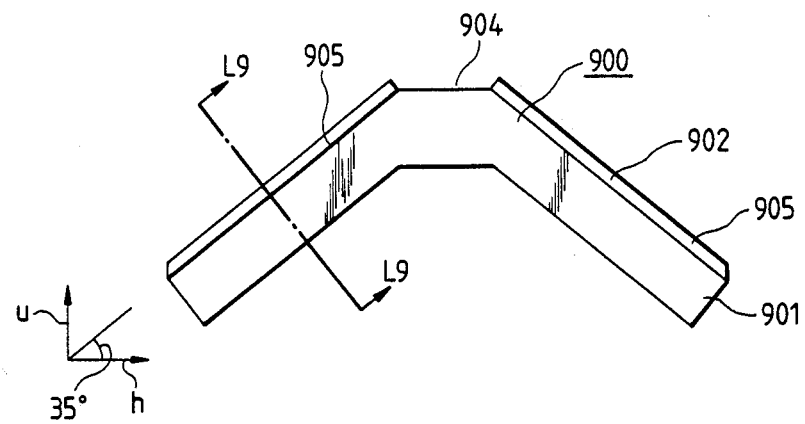
FIG. 7 is a front view of the partition wall in the embodiment of FIGS. 1 and 2.
Figure 8:
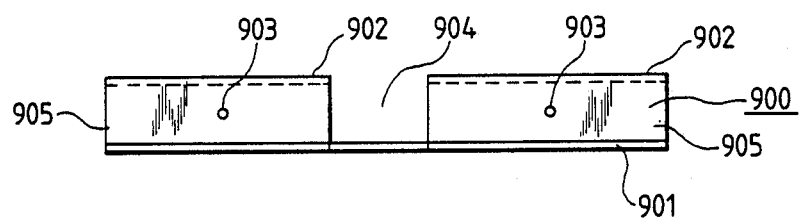
FIG. 8 is a bottom view of the partition wall in the embodiment of FIGS. 1 and 2.
Figure 9:
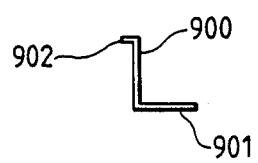
FIG. 9 is a sectional view of the partition wall taken along the line L9—L9 of FIG. 7.

As shown in FIGS. 7, 8, and 9, the partition wall 900 includes a section 901 bonded to the shell 600, sections 902 contacting the stem 100, and a pair of main sections or flat plates 905 extending between the sections 901 and 902. As shown in FIG. 1, the main plates 905 separate the interior of the package into two chambers A and B. Each of the main plates 905 has a communication hole 903 connecting the chambers A and B. The main plates 905 are spaced from each other to define a communication opening 904 connecting the chambers A and B.

In cases where an object to be monitored in acceleration is a vehicle body, the acceleration sensor is attached to the vehicle body in such a manner that the direction U of the acceleration sensor of FIG. 1 agrees with the upward vertical direction of the vehicle body and that the direction of the acceleration sensor of FIG. 1 which is perpendicular to both the vertical direction U and the horizontal direction h of the acceleration sensor agrees with the normal direction of travel of the vehicle body.

As shown in FIGS. 1 and 7, the main plates 905 of the partition wall 900 incline with respect to the horizontal direction h at a predetermined angle, for example, 35°. The main plates 905 slope upward as viewed in the directions toward the communication opening 904. Accordingly, the communication opening 904 extends at the top of the partition wall 900. The positions of the communication holes 903 are lower than the position of the communication opening 904.

The original width of the main plates 905 of the partition wall 900 is slightly greater than the depth of the package internal space defined between the stem 100 and the shell 600. During the assembly of the acceleration sensor, the section 901 of the partition wall 900 is welded to the shell 600, and then the sections 902 of the partition wall 900 are pressed into contact with the stem 100 as the shell 600 is forced toward the stem 100. In this way, the partition wall 900 is mechanically connected to the stem 100 and the shell 600.

The angle between the main plates 905 and the horizontal direction h is preferably large. In practice, this angle is limited by various factors such as the size of the acceleration sensor and the assembly of the acceleration sensor.

As shown in FIGS. 1 and 2, the package of the acceleration sensor contains damping liquid 700 and gas 800 such as air. A major part of the upper chamber B within the package is filled with the gas 800. The lower chamber A within the package is filled with the damping liquid. The sensor element resides in the lower chamber A so that it is submerged in the damping liquid 700.

The communication holes 903 are designed to allow the damping liquid 700 to flow from the upper chamber B to the lower chamber A due to the gravity. In addition, the communication holes 903 are preferably designed to prevent the damping liquid 700 from easily flowing back and forth through the communication holes 903. From this standpoint, the size of the communication holes 903 is preferably small. For example, in the case where the viscosity of the damping liquid 700 is in the range of 500–2,000 cs, the diameter of the communication holes 903 is preferably approximately 0.4 mm.

In general, the damping liquid 700 expands and contracts with temperature variations. The introduction of the gas 800 into the package is to compensate for such expansion and contraction of the damping liquid 700. Thus, the package is partially filled with the damping liquid 700. In this case, as the sensor element vibrates in response to an acceleration, the damping liquid 700 tends to exhibit a choppy motion which would cause a noise in an output signal from the sensor element. The partition wall 900 functions to prevent or suppress such a choppy motion of the damping liquid 700.

The communication opening 904 is designed to return a bubble of the gas 800 from the lower chamber A to the upper chamber B due to the buoyancy. As the size of the communication opening 904 decreases, the partition wall 900 more effectively suppresses a choppy motion of the damping liquid 700 but it is more difficult for a bubble of the gas 800 to pass through the communication opening 904. In one example where the angle of the main plates 905 of the partition wall 900 with respect to the horizontal direction h is 40° and the viscosity of the damping liquid 700 is 50 cs, the diameter of the communication opening 904 is preferably about 1.5 mm.

As shown in FIGS. 1 and 5, the shell 600 has holes 602 and 603. During the assembly of the acceleration sensor, the hole 602 allows the damping liquid 700 to be injected into the package. The hole 603 allows the escape of air from the package during the injection of the damping liquid 700 into the package. After the shell 600 and the stem 100 are airtightly bonded together by an electric-resistance welding process, an outlet needle of a liquid injector is inserted into the package via the hole 602 and a predetermined quantity of the damping liquid 700 is injected into the package so that the injected damping liquid 700 can fill the lower chamber A. In this case, a predetermined quantity of air remains in the package and the whole of the remaining air is generally contained in the upper chamber B. The remaining air constitutes the gas 800. After the injection of the damping liquid 700 into the package is completed, the holes 602 and 603 are blocked by solder to airtightly close the package. In this way, the damping liquid 700 and the gas 800 are sealingly held in the package.

As understood from the previous description, when the assembly of the acceleration sensor is completed, the lower chamber A is essentially filled with the damping liquid 700 and the upper chamber B is essentially filled with the gas 800. When the acceleration sensor is attached to a measured objected, the acceleration sensor is placed in the previously-mentioned predetermined directional relationship with the object where the chambers A and B can remain essentially filled with the damping liquid 700 and the gas 800 respectively. After the acceleration sensor is assembled but before the acceleration sensor is attached to the object, there is a chance that the acceleration sensor is placed in various directions and thus portions of the gas 800 and the damping liquid 700 undesirably enter the chambers A and B respectively. Even in such a case, when the acceleration sensor is placed in the predetermined direction with respect to the object, the gas 800 in the lower chamber A moves upward along the inclined main plates 905 of the partition wall 900 due to a buoyancy and then the gas 800 returns from the lower chamber A to the upper chamber B via the communication opening 904. The inclined structure of the main plates 905 of the partition wall 900 ensures smooth and quick return of the gas 800 from the lower chamber A to the upper chamber B. Accordingly, the gas 800 is reliably prevented from staying in the lower chamber A. This results in the acceleration sensor having excellent characteristics as will be made clear hereafter. During the gas return to the upper chamber B, a portion of the damping liquid 700 which corresponds to the volume of the returned gas 800 moves from the upper chamber B to the lower chamber A via the communication holes 903 due to gravity.

It should be noted that the gas 800 staying in the lower chamber A would adversely affect the acceleration sensor characteristics as follows. First, such gas 800 degrades the reproducibility of the acceleration sensor. In addition, such gas 800 in a bubble form horizontally moves back and forth in response to a vibration of a measured object and thereby agitates the damping liquid 700. The agitation of the damping liquid 700 causes the cantilever 4a to undergo a lateral acceleration which acts in the longitudinal direction of the cantilever 4a, so that the directivity of the acceleration sensor is impaired and the characteristics of the acceleration sensor are reduced.

The size of the communication holes 903 is chosen so as to enable the damping liquid 700 to return from the upper chamber B to the lower chamber A due to gravity but to prevent the damping liquid 700 from moving from the lower chamber A to the upper chamber B due to normal vibrations received from a measured object. Accordingly, the damping liquid 700 is prevented from flowing back and forth or circularly through the communication holes 903. Since such a flow of the damping liquid 700 would cause the cantilever 4a to undergo a lateral acceleration which acts in the longitudinal direction of the cantilever 4a, the prevention of the flow ensures excellent characteristics of the acceleration sensor as in the case of the prevention of the stay of the gas 800 in the lower chamber A.

The provision of a single communication opening 904 allows only a very small rate of undesirable flow of the damping liquid 700 via the communication opening 904.

It is preferable that the partition wall 900 is symmetrical with respect to the cantilever 4a. The symmetrical structure of the partition wall 900 ensures that the cantilever 4a receives a symmetrically distributed force travelling from the partition wall 900 via the damping liquid 700. The symmetrically distributed force enables a high accuracy of the acceleration sensor.

DESCRIPTION OF THE SECOND PREFERRED EMBODIMENT

Figure 10:
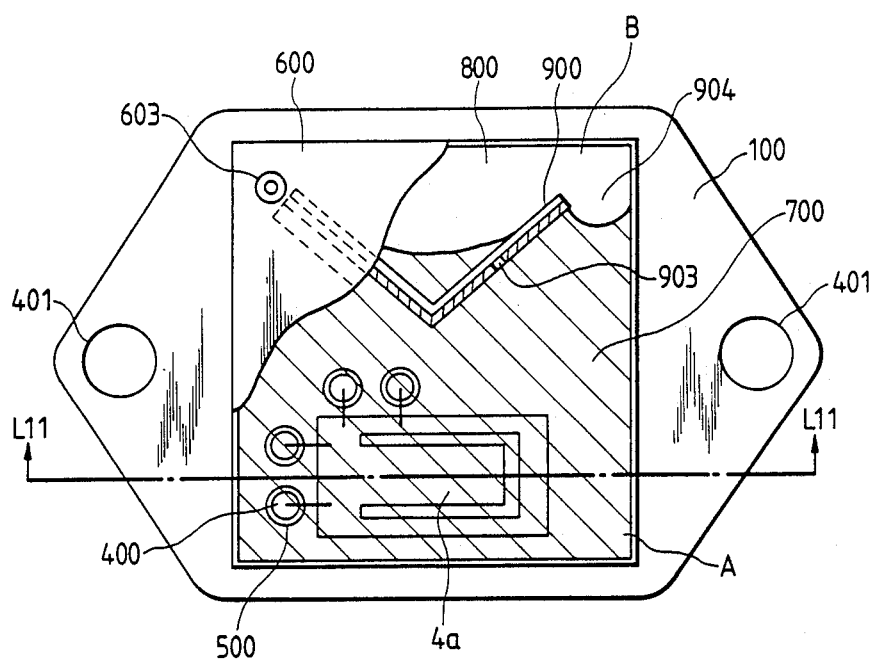
FIG. 10 is a partially cutaway view of an acceleration sensor according to a second embodiment of this invention.
Figure 11:
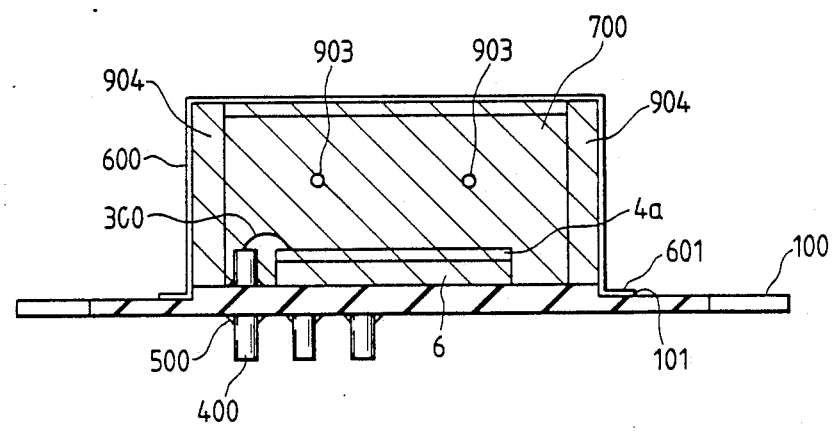
FIG. 11 is a sectional view of the acceleration sensor taken along the line L11—L11 of FIG. 10.

FIGS. 10 and 11 show a second embodiment of this invention which is similar to the embodiment of FIGS. 1-9 except for the design changes described hereafter.

In the embodiment of FIGS. 10 and 11, a partition wall 900 has a V-shaped section. A pair of communication openings 904 are defined between upper edges of the partition wall 900 and walls of a shell 600.

DESCRIPTION OF THE THIRD PREFERRED EMBODIMENT

Figure 12:
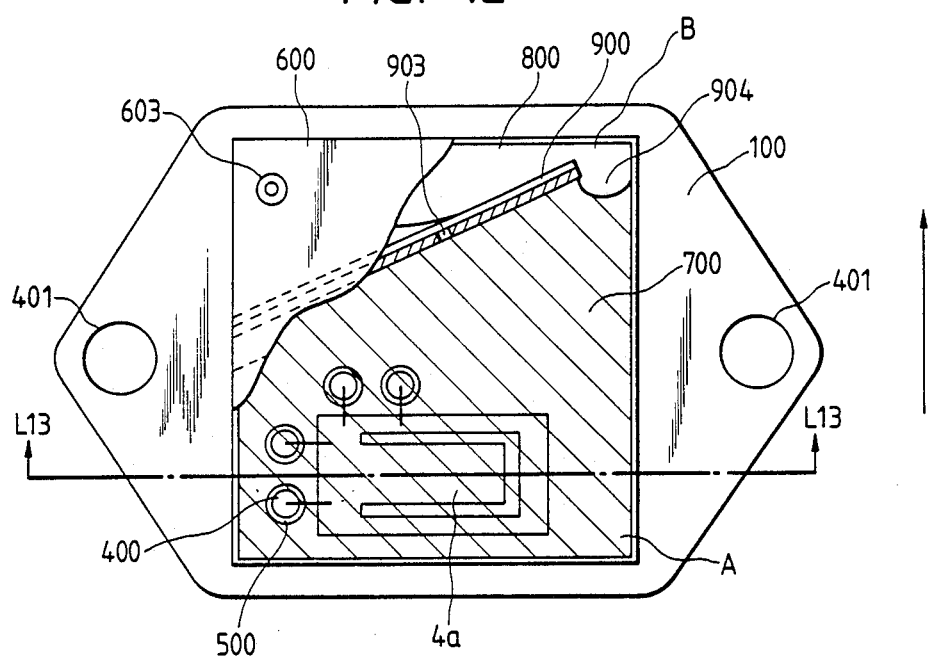
FIG. 12 is a partially cutaway view of an acceleration sensor according to a third embodiment of this invention.
Figure 13:
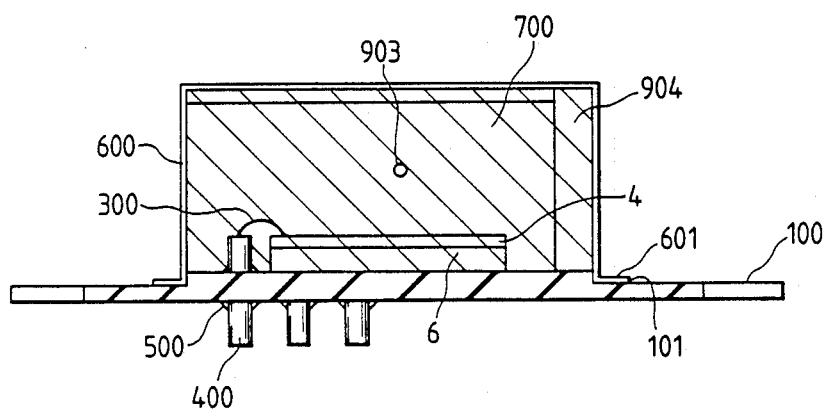
FIG. 13 is a sectional view of the acceleration sensor taken along the line L13—L13 of FIG. 12.

FIGS. 12 and 13 show a third embodiment of this invention which is similar to the embodiment of FIGS. 1-9 except for the design changes described hereafter.

In the embodiment of FIGS. 12 and 13, a partition wall 900 is uniformly inclined. A communication opening 904 is defined between an upper edge of the partition wall 900 and walls of a shell 600. A communication hole 903 extends through a central portion of the partition wall 900.

DESCRIPTION OF THE FOURTH PREFERRED EMBODIMENT

Figure 14:
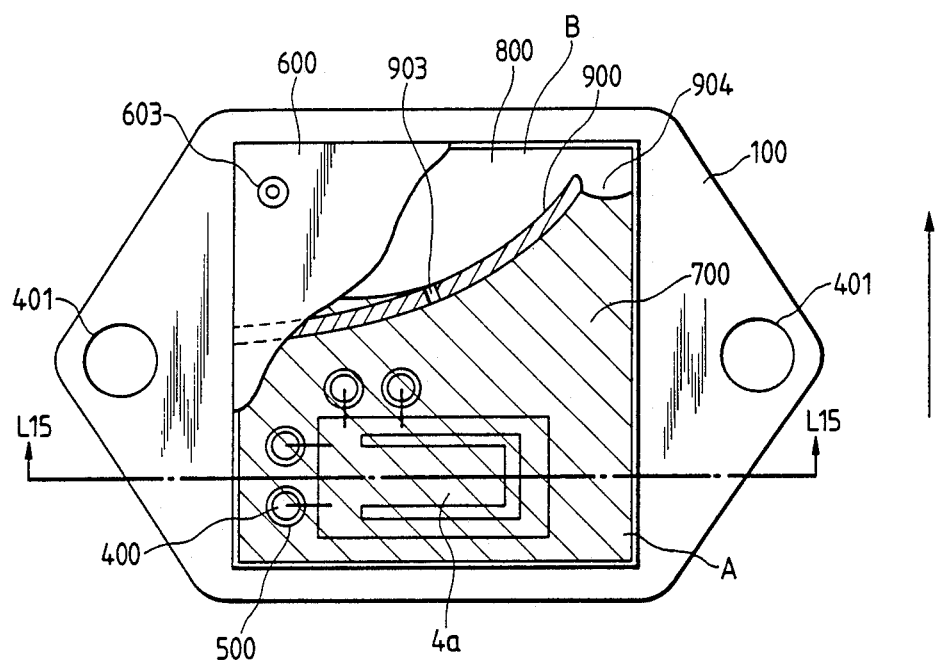
FIG. 14 is a partially cutaway view of an acceleration sensor according to a fourth embodiment of this invention.
Figure 15:
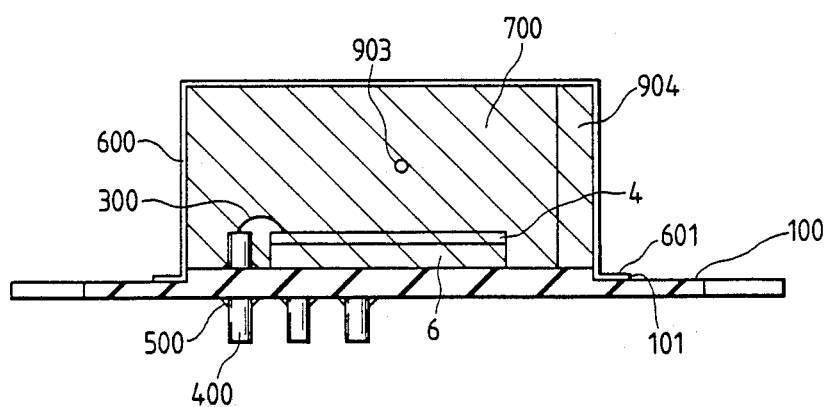
FIG. 15 is a sectional view of the acceleration sensor taken along the line L15—L15 of FIG. 14.

FIGS. 14 and 15 show a fourth embodiment of this invention which is similar to the embodiment of FIGS. 1-9 except for the design changes described hereafter.

In the embodiment of FIGS. 14 and 15, a partition wall 900 is inclined and curved. A communication opening 904 is defined between an upper edge of the partition wall 900 and walls of a shell 600. A communication hole 903 extends through a central portion of the partition wall 900.

DESCRIPTION OF THE FIFTH PREFERRED EMBODIMENT

Figure 16:
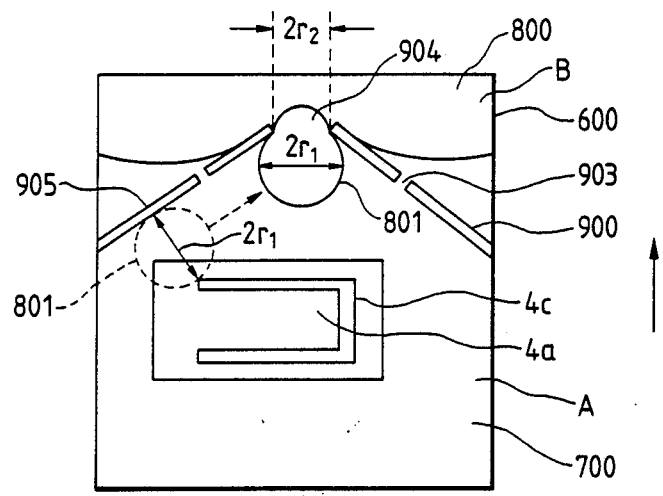
FIG. 16 is a diagram of an acceleration sensor according to a fifth embodiment of this invention.
Figure 19:
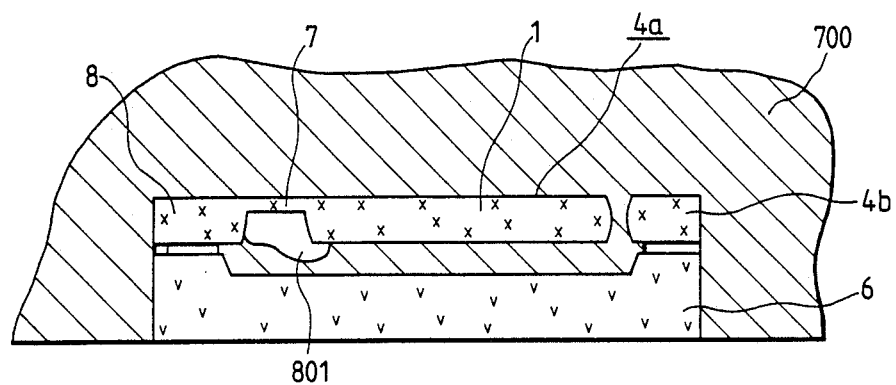
FIG. 19 is a sectional view of the sensor element of FIGS. 16 and 17.

Under conditions where a bubble 801 of gas 800 resides in a lower chamber A and reaches a gap 4c around a cantilever 4a as shown by the circle of broken lines in FIG. 16, when an impulse is applied to an acceleration sensor, a portion of the gas bubble 801 is sometimes drawn into and trapped in a space between the cantilever 4a and a base 6 as shown in FIG. 19. The trapped gas bubble 801 tends to stay in the space between the cantilever 4a and the base 6. The trapped gas bubble 801 causes an abnormal output signal from the acceleration sensor.

A fifth embodiment of this invention is designed to prevent such a problem. The fifth embodiment of this invention is similar to the embodiment of FIGS. 1-9 except for the design changes described hereafter. The fifth embodiment of this invention will be further described with reference to FIGS. 16-18.

In the case where the smallest distance between a partition wall 900 and the gap 4c is denoted by the character $2r_1$, it is preferable that a gas bubble 801 having a diameter equal to or greater than the value $2r_1$ is prevented from staying in the lower chamber A. From this standpoint, the size of a communication opening 904 is preferably chosen so that a gas bubble 801 having a diameter equal to or greater than the value $2r_1$, can easily return from the lower chamber A to an upper chamber B due to its buoyancy.

The diameter of the communication opening 904 is denoted by the character $2r_2$. Under conditions where the bubble diameter $2r_1$ is smaller than the opening diameter $2r_2$, the gas bubble 801 can pass through the communication opening 904. A pressure $P_1$ required to generate a gas bubble having a diameter equal to the value $2r_2$ is given by the following equation.

$$P_1 = Ts/(2r_2) \qquad (1)$$

where the character Ts denotes the surface tension of damping liquid 700. In the case where the damping liquid 700 is composed of silicone oil having a viscosity of 50 cs, the surface tension Ts is 20.5 dyn/cm.

A pressure $P_2$ which is applied to a gas bubble 801 of a diameter equal to the value $2r_1$ at an opening of a diameter equal to the value $2r_2$ is given by the following equation.

$$P_2 = (W_1 \cdot \pi r_2^2 / \pi r_1^2 \cdot G)/(\pi r_2^2) \qquad (2)$$

where the character $W_1$ denotes the mass of the damping liquid 700 which corresponds to the volume of the gas bubble 801, and the character G denotes the acceleration of gravity. When it is assumed that the gas bubble 801 is spherical, the mass $W_1$ equals $4/3\pi r_1^3 \cdot \rho$ where the character $\rho$ denotes the specific gravity of the damping liquid 700. In the case of silicone oil, the specific gravity $\rho$ is 0.96 g/cm$^3$.

In order that the gas bubble 801 of a diameter equal to the value $2r_1$ passes through the opening of a diameter equal to the value $2r_2$, it is necessary to satisfy the following condition.

$$P_1 < P_2$$

This condition is changed into the following relationship by use of the equations (1) and (2).

$$r_2 > \{(\pi r_1^2)/(W_1 G)\} \cdot (Ts/2) = (3Ts)/(8r_1 \rho G) \qquad (3)$$

For example, in the case where the value $r_1$ equals 0.2 cm, when the value $r_2$ is equal to or greater than 0.41 mm, a gas bubble 801 is prevented from entering the space between the cantilever 4a and the base 6.

As understood from the previous description, when the diameter $2r_2$ of the communication opening 904 is chosen in accordance with the smallest distance $2r_1$ between the partition wall 900 and the gap 4c so as to satisfy the relationship (3), a gas bubble 801 of a diameter equal to or greater than the value $2r_1$ is prevented from staying the lower chamber A and from entering the space between the cantilever 4a and the base 6.

In the case where the communication opening 904 is rectangular, since a gas bubble 801 which passes through the communication opening 904 takes approximately a spherical form due to the surface tension by the damping liquid 700, the size of the communication opening 904 can be set similarly by use of the equations (1)-(3).

Figure 17:
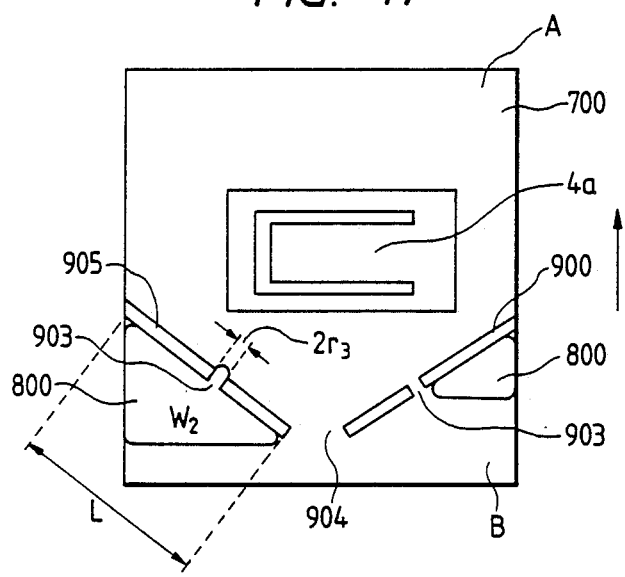
FIG. 17 is a diagram of the acceleration sensor of the fifth embodiment of this invention which is inverted with respect to the acceleration sensor of FIG. 16.
Figure 18:
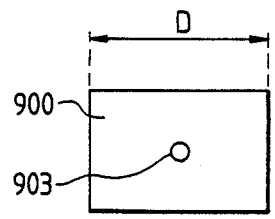
FIG. 18 is a side view of the partition wall of FIGS. 16 and 17.

FIG. 17 shows the acceleration sensor which is placed in a direction opposite the normal direction. In the acceleration sensor of FIG. 17, gases 800 stay in the chamber below the partition wall 900. As shown in FIG. 17, the diameter of the communication holes 903 is denoted by the character $2r_3$, and the length of each of the main plates 905 of the partition wall 900 is denoted by the character L. FIG. 18 shows the partition wall 900 as viewed in the lateral direction. In FIG. 18, the character D denotes the depth or width of the partition wall 900. The buoyancy acting on gas 800 in liquid increases as the volume of the gas 800 increases. In cases where the size of the communication holes 903 is designed so that the gas 800 which has the greatest volume among gases able to stay in the chamber below the partition wall 900 will not pass through the communication holes 903, a gas bubble 801 is prevented from entering the chamber A.

A pressure $P_3$ required to generate a gas bubble having a diameter equal to the value $2r_3$ is given by the following equation.

$$P_3 = Ts/(2r_3) \qquad (4)$$

A pressure $P_4$ which is applied to a gas bubble 801 of a diameter equal to the value $2r_3$ at the communication hole 903 is given by the following equation.

$$P_4 = (W_2 \cdot \pi r_3^2 / S \cdot G)/(\pi r_3^2) \qquad (5)$$

where the character $W_2$ denotes the mass of the damping liquid 700 which corresponds to the greatest volume of gas 800 able to stay in the chamber below the partition wall 900, and the character S denotes the area of the main plate 905 of the partition wall 900 and equals the value L multiplied by the value D.

In order to prevent the gas 800 from passing through the communication hole 903, it is necessary to satisfy the following condition.

$$P_3 > P_4$$

This condition is changed into the following relationship by use of the equations (4) and (5).

$$r_3 < \{S/(W_2 G)\} \cdot (Ts/2) \qquad (6)$$

For example, in the case where the values $W_2$, D, and L are 0.15 g, 0.35 cm, and 1.3 cm respectively and where the gas 800 occupies 11% of the total internal volume of the package, when the value $r_3$ is smaller than 0.32 mm, a gas bubble 801 is prevented from entering the chamber A.

As understood from the previous description, when the diameter $2r_3$ of the communication holes 903 is chosen in accordance with the greatest volume of gas 800, which can stay in the chamber below the partition wall 900, so as to satisfy the relationship (6), a gas bubble 801 is prevented from entering the chamber A and from entering the space between the cantilever 4a and the base 6.

DESCRIPTION OF THE SIXTH PREFERRED EMBODIMENT

Figure 20:
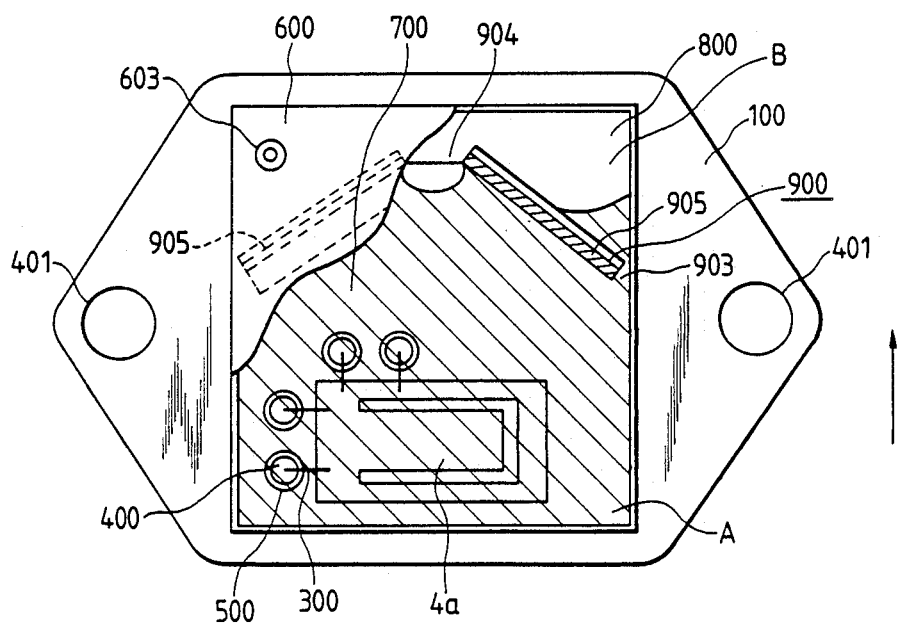
FIG. 20 is a partially cutaway view of an acceleration sensor according to a sixth embodiment of this invention.

FIG. 20 shows a sixth embodiment of this invention which is similar to the embodiment of FIGS. 1–9 except for the design changes described hereafter.

In the embodiment of FIG. 20, main plates 905 of a partition wall 900 have no hole. A pair of communication holes 903 are defined between lower edges of the partition wall 900 and walls of a shell 600.

DESCRIPTION OF THE SEVENTH PREFERRED EMBODIMENT

Figure 21:
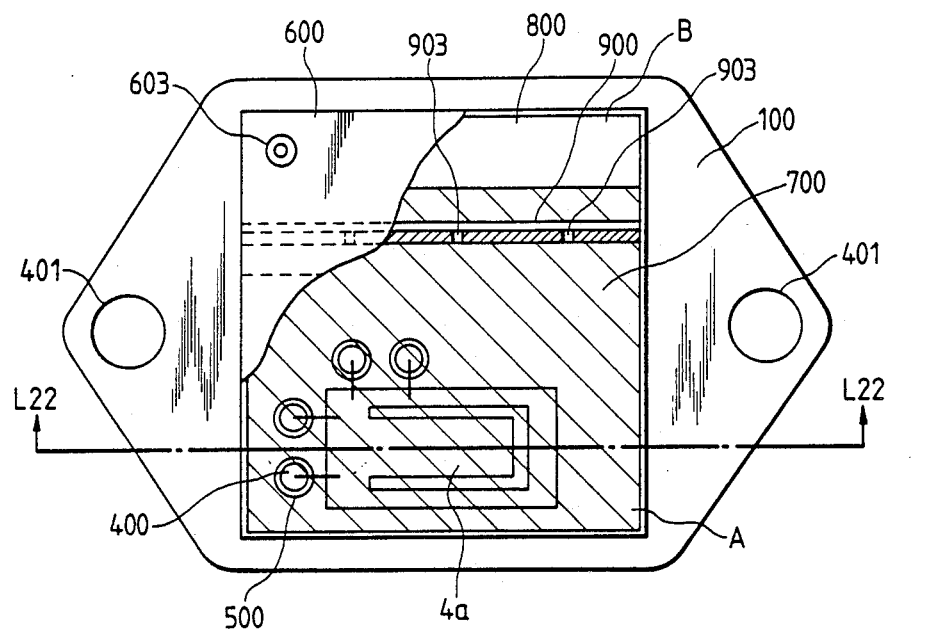
FIG. 21 is a partially cutaway view of an acceleration sensor according to a seventh embodiment of this invention.
Figure 22:
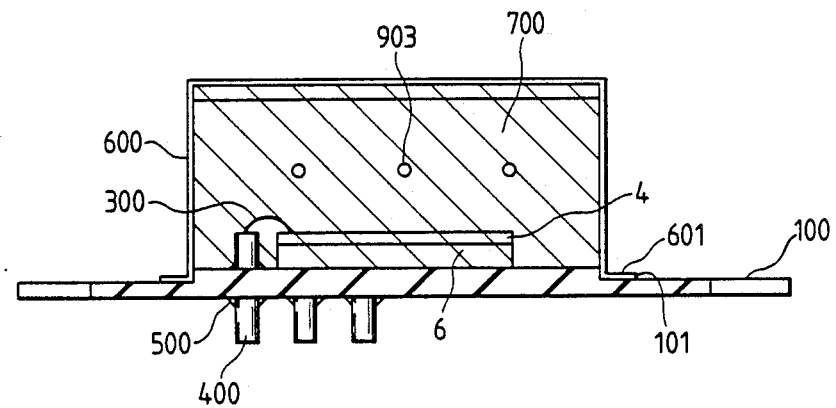
FIG. 22 is a sectional view of the acceleration sensor taken along the line L22—L22 of FIG. 21.

FIGS. 21 and 22 show a seventh embodiment of this invention which is similar to the embodiment of FIGS. 1–9 except for the design changes described hereafter.

In the embodiment of FIGS. 21 and 22, a partition wall 900 extends flat and horizontally, and a communication opening 904 (see FIG. 1) is omitted. The diameter of communication holes 903 of the partition wall 900 is chosen so that damping liquid 700 can pass through the communication holes 903 but gas 800 in the damping liquid 700 can not pass through the communication holes 903.

Accordingly, a bubble of the gas 800 is prevented from entering a chamber A. It is preferable that the diameter of the communication holes 903 is small enough to prevent the damping liquid 700 from flowing back and forth or circularly via the communication holes 903. Specifically, the diameter of the communication holes 903 is smaller than the value $2r_3$ which is determined by the equation (6).

DESCRIPTION OF THE EIGHTH PREFERRED EMBODIMENT

Figure 23:
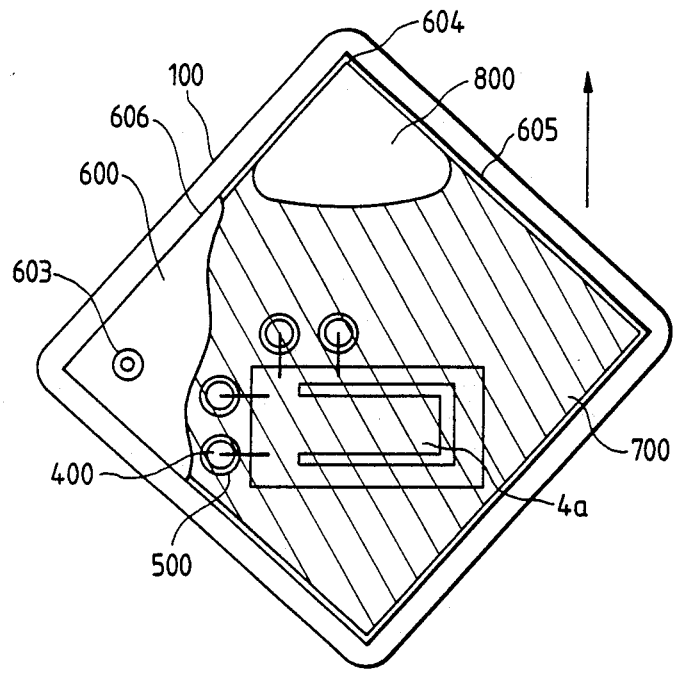
FIG. 23 is a partially cutaway view of an acceleration sensor according to an eighth embodiment of this invention.

FIG. 23 shows an eighth embodiment of this invention which is similar to the embodiment of FIGS. 1–9 except for the design changes described hereafter.

A partition wall is omitted from the embodiment of FIG. 23. In the embodiment of FIG. 23, a shell 600 and a stem 100 form a diamond-shaped package. When a semiconductor acceleration sensor of the embodiment of FIG. 23 is attached to a measured objected, the acceleration sensor is directed so that a corner 604 of the shell 600 assumes the highest location.

It is assumed that gas 800 now extends in a region different from the corner 604 due to some causes. Such gas 800 moves upward by the buoyancy and then usually reaches one of upper side walls 605 and 606 of the shell 600. Since the upper walls 605 and 606 incline with respect to the horizontal direction, the gas 800 moves upward along one of the upper walls 605 and 606 to the corner 604 and then stays at the corner 604. The corner 604 holds the gas 800 and limits the horizontal movement of the gas 800. The limitation of the horizontal movement of the gas 800 ensures excellent characteristics of the acceleration sensor.

It should be noted that a partition wall may be provided to suppress the flow of the damping liquid 700.

DESCRIPTION OF THE NINTH PREFERRED EMBODIMENT

Figure 24:
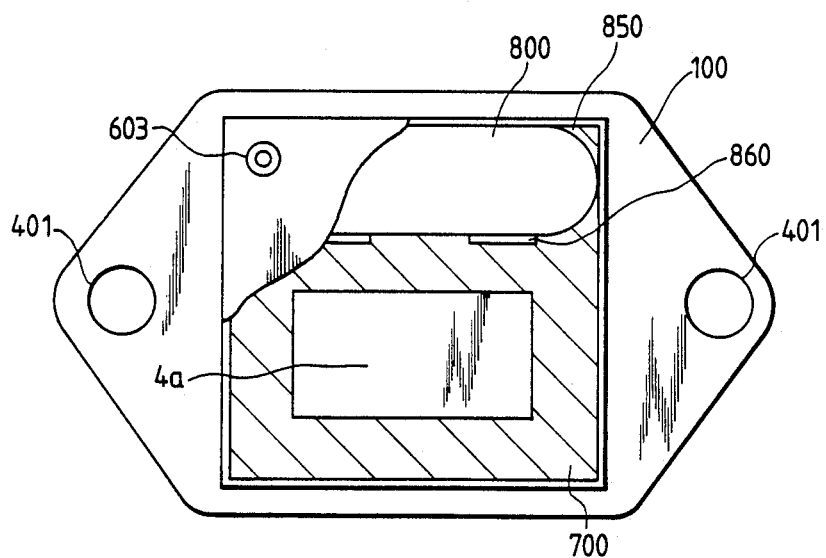
FIG. 24 is a partially cutaway view of an acceleration sensor according to a ninth embodiment of this invention.

FIG. 24 shows a ninth embodiment of this invention which is similar to the embodiment of FIGS. 1–9 except for the design changes described hereafter.

A partition wall 900 is omitted from the embodiment of FIG. 24. In the embodiment of FIG. 24, a bag 850 made of material such as vinyl contains air 800. The air bag 850 is disposed in a package of a semiconductor acceleration sensor and is supported by fixing members 860 connected to the walls of the package. The air bag 850 is spaced from a sensor element 1.

It should be noted that the air bag 850 may be directly bonded to the walls of the package.

The provision of the air bag 850 prevents an unwanted flow of damping liquid 700 and also an unwanted movement of the gas 800, so that excellent characteristics of the acceleration sensor are ensured.

DESCRIPTION OF THE TENTH PREFERRED EMBODIMENT

Figure 25:
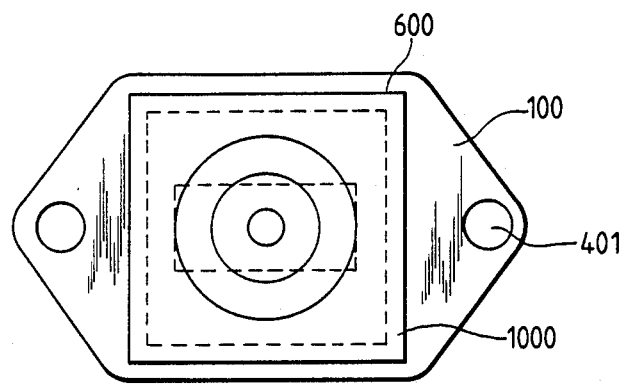
FIG. 25 is a top view of an acceleration sensor according to a tenth embodiment of this invention.
Figure 26:
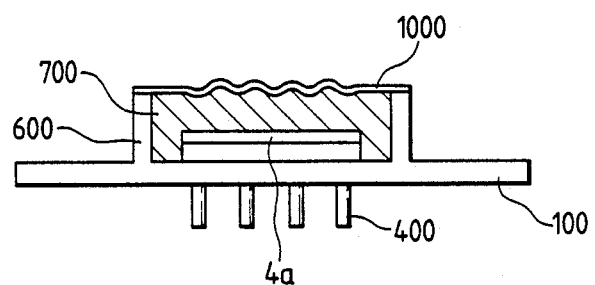
FIG. 26 is a sectional view of the acceleration sensor of FIG. 25.

FIGS. 25 and 26 show a tenth embodiment of this invention which is similar to the embodiment of FIGS. 1-9 except for the design changes described hereafter.

In the embodiment of FIGS. 25 and 26, a cylindrical shell 600 integrally extends from a stem 100 and has an open upper end. After the interior of the shell 600 is filled with damping liquid 700, the upper end of the shell 600 is closed by a metal diaphragm 1000. The metal diaphragm 1000 is sealingly welded to the shell 600 so that the damping liquid 700 is sealingly held in a package formed by the stem 100, the shell 600, and the metal diaphragm 1000.

The metal diaphragm 1000 absorbs thermal expansion and contraction of the damping liquid 700. Since the package is fully filled with the damping liquid 700, a choppy motion of the damping liquid 700 is prevented and the ingress of gas into the package is prevented.

DESCRIPTION OF THE OTHER PREFERRED EMBODIMENTS

The communication holes 903 may be omitted from the embodiments of FIGS. 1-20. In these cases, the flow of the damping liquid 700 through the communication holes 903 is prevented. In these cases, when a portion of the damping liquid 700 enters the chamber B, it takes a long time for this portion of the damping liquid 700 to return to the chamber A.

In the embodiments of FIGS. 1-26, a semiconductor sensor element may be replaced by a sensor element of a piezo-electric type or a metal distortion type.

In the embodiments of FIGS. 1-26, a cantilever of a semiconductor sensor element may be replaced by a beam having supported opposite ends.

In the embodiments of FIGS. 1-26, the partition wall 900 may have steps. In these cases, the partition wall 900 is designed so that its outline inclines with respect to the horizontal direction.

What is claimed is:

1. An acceleration sensor adapted for attachment to an object where acceleration is to be measured, the sensor comprising:
   a package having at least one chamber;
   a sensor element disposed in the chamber and having a portion which vibrates in response to the acceleration;
   a damping liquid sealed within the package and having a quantity which allows the sensor element to be submerged in the damping liquid and which allows a predetermined quantity of gas to remain in the package, the gas absorbing a thermally-induced volume change of the damping liquid; and
   means for preventing a gas bubble from separating from the gas in the absence of the acceleration, and for preventing the gas bubble from staying in the chamber, wherein the preventing means comprises a wall defining the chamber and extending above the sensor element, and at least part of the wall is oblique with respect to a horizontal direction.

2. The acceleration sensor of claim 1 wherein the preventing means comprises a partition wall separating an interior of the package into the chamber and a room which extends above the chamber, at least part of the partition wall is oblique with respect to a horizontal direction, and the oblique part of the partition wall has an opening connecting the chamber and the room.

3. The acceleration sensor of claim 2, wherein the sensor element has a gap partially surrounding the vibrating portion of the sensor element, and a diameter $2r_2$ of the opening is chosen to satisfy the following relationship:

$$r_2 > \{(\pi r_1^2)/(W_1 G)\} \cdot (T_s/2)$$

where the character $2r_1$ denotes a smallest distance between the partition wall and the gap, the character $W_1$ denotes a mass of a volume of the damping liquid which equals a volume of a sphere of a diameter equal to the distance $2r_1$, the character $T_s$ denotes a surface tension of the damping liquid, and the character $G$ denotes an acceleration of gravity.

4. The acceleration sensor of claim 2 wherein the the partition wall has a hole located in a position lower than a position of the opening and connecting the chamber and the room.

5. The acceleration sensor of claim 4 wherein a diameter $2r_3$ of the hole is chosen to satisfy the following relationship:

$$r_3 < \{S/(W_2 G)\} \cdot (T_s/2)$$

where the character $W_2$ denotes a mass of a volume of the damping liquid which corresponds to a greatest volume of gas able to stay in the room, the character $S$ denotes an area of a portion of the partition wall which contacts the gas, the character $T_s$ denotes a surface tension of the damping liquid, and the character $G$ denotes an acceleration of gravity.

6. The acceleration sensor of claim 1 wherein the preventing means comprises a partition wall separating an interior of the package into the chamber and a room which extends above the chamber, the partition wall has a hole connecting the chamber and the room, and a diameter of the hole is chosen to allow movement of the damping liquid therethrough but inhibit movement of gas in the damping liquid therethrough.

7. The acceleration sensor of claim 6 wherein the diameter $2r_3$ of the hole is chosen to satisfy the following relationship:

$$r_3 < \{S/(W_2 G)\} \cdot (T_s/2)$$

where the character $W_2$ denotes a mass of a volume of the damping liquid which corresponds to a greatest volume of gas able to stay in the room, the character $S$ denotes an area of a portion of the partition wall which contacts the gas, the character $T_s$ denotes a surface tension of the damping liquid, and the character $G$ denotes an acceleration of gravity.

8. An acceleration sensor comprising:
   a package having a main chamber;
   a partition wall dividing the chamber into an upper sub chamber and a lower sub chamber;
   a sensor element disposed in the lower sub chamber and having a portion which vibrates in response to an acceleration;
   damping liquid substantially filling the lower sub chamber;
   gas substantially filling the upper sub chamber;
   wherein the partition wall includes a plate extending obliquely from its lower end to its upper end, the upper end of the plate defining an opening connecting the upper and lower sub chambers, and the oblique plate guiding a gas bubble in the lower sub chamber toward the opening and moving the gas bubble from the lower sub chamber into the upper sub chamber through the opening by a buoyancy.

* * * * *